(No Model.)
O. BERGSTROM.
RAKE.
No. 254,593. Patented Mar. 7, 1882.
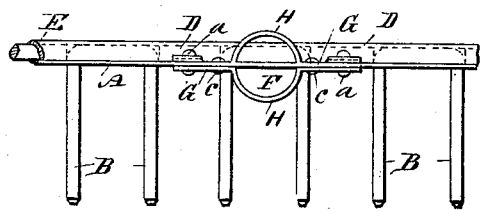
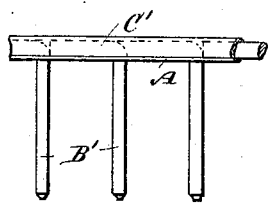
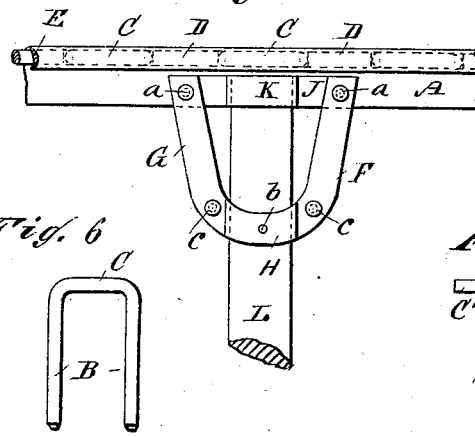
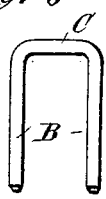
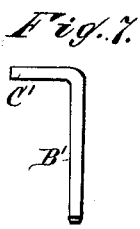
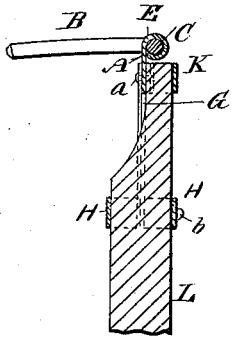
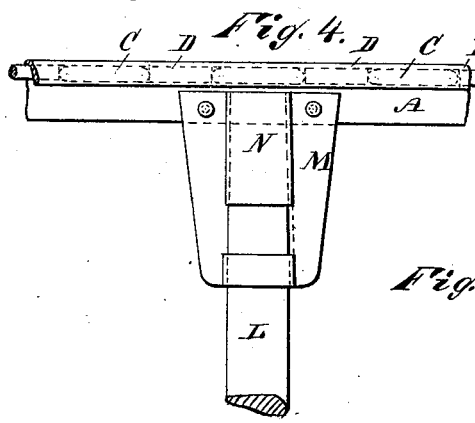
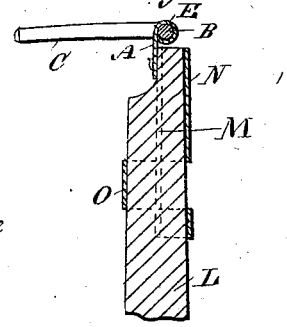
WITNESSES:
Theo. G. Hostrom
C. Sedgwick
INVENTOR:
O. Bergstrom
BY Munn & Co.
ATTORNEYS.
N. PETERS, Photo-Lithographer, Washington, D. C.

UNITED STATES PATENT OFFICE.

OLOF BERGSTROM, OF FINSHYTTAN, SWEDEN.

RAKE.

SPECIFICATION forming part of Letters Patent No. 254,593, dated March 7, 1882.

Application filed December 3, 1881. (No model.) Patented in Sweden October 5, 1881.

*To all whom it may concern:*

Be it known that I, OLOF BERGSTROM, of Finshyttan, Sweden, have invented a new and Improved Rake, of which the following is a full, clear, and exact description.

The object of my invention is to provide a new and improved rake which is strong and durable and can be used for raking hay, earth, &c.

The invention consists in a rake formed of a metal plate provided with apertures through which the teeth are passed, upon which the outer longitudinal edge of this plate is bent over the transverse pieces of the teeth to form a hollow bead for holding the teeth in place, which bead may be stiffened by filling-pieces inserted between the ends of the transverse pieces of the teeth. A handle-socket is formed of two bent U-shaped strips and a bent transverse strip, all riveted to the head-plate holding the teeth.

Reference is to be had to the accompanying drawings, forming part of this specification, in which similar letters of reference indicate corresponding parts in all the figures.

Figure 1 is a rear longitudinal elevation of my improved rake, showing the handle removed. Fig. 2 is a plan view of the same. Fig. 3 is a cross-sectional elevation of the same. Fig. 4 is a plan view of a modified construction. Fig. 5 is a cross-sectional elevation of the same. Figs. 6, 7, and 8 show the different constructions of the teeth of the rake. Fig. 9 is a longitudinal elevation of a part of a rake constructed with L-shaped teeth.

A metal plate, A, is provided with a series of apertures, through which the teeth B are passed, the transverse piece C resting on the plate A. The teeth may be U-shaped, as shown in Figs. 1, 2, 4, and 6, or they may be L-shaped, as shown at B' in Figs. 7 and 9, or T-shaped, as shown at B² in Fig. 8. If the teeth are U-shaped, filling-pieces D D must be inserted between the teeth for the purpose of holding them firmly, and to strengthen and stiffen the head-plate A of the rake, as shown in Figs. 1, 2, and 4. If the L-shaped teeth B' are used, the end of each transverse piece C' must rest against the next tooth B', as shown in Fig. 9, and if T-shaped teeth B² are used, the ends of the transverse pieces C² must be in contact. After the teeth have been inserted the outer longitudinal edge of the head-plate A is bent or turned over the transverse pieces of the teeth, thereby forming a hollow bead, E, at the outer longitudinal edge of the head-plate A, whereby the teeth are held in place and the head-plate is strengthened and stiffened.

The handle-socket F is formed of two U-shaped strips or bands, G, which are provided with a bend, H, in the middle, one of these bands being placed on the upper side and the other on the lower side of the head-plate A. The ends of these U-shaped strips or bands G are held to the plate A by rivets $a$, also passing through a metal strap or band, J, bent to form a semicircular loop, K, on the plate A, the ends of the upper U-shaped band or strip, G, resting on the ends of the strap J, as shown in Fig. 2. The U-shaped strips are also united by rivets $c$ at the sides of the bends H.

The end of the handle L is beveled to fit into the loop K, and the handle is then passed through the socket formed by the bent or curved parts H of the strips G, and into the loop or socket K. Preferably a nail or pin, $b$, is driven through one of the U-shaped strips G into the handle, as shown in Figs. 2 and 3.

The handle-socket may also be constructed of a metal plate, M, riveted on the head-plate A and provided with a longitudinal semicircular hollow ridge, N. At its outer end the plate is provided with two transverse cuts, and the part O, between these cuts, is bent downward to form a semicircular strap.

The handle L is constructed as described above, and is passed into the socket thus formed.

The teeth of this rake are held firmly and a broken tooth can easily be replaced.

Having thus fully described my invention, I claim as new and desire to secure by Letters Patent—

1. A rake constructed, substantially as herein shown and described, with a metal plate provided with apertures, through which the teeth are passed, the outer longitudinal edge of this plate being bent over the upper transverse pieces of the teeth, as set forth.

2. In a rake, the combination, with the plate A, bent to form a hollow bead, E, at the outer longitudinal edge, of the teeth B, passed through apertures in the plate A, substantially as herein shown and described.

3. In a rake, the combination, with the plate A, bent to form a hollow bead, E, at the outer longitudinal edge, of the teeth B, passed through apertures in the plate A, and of the filling-pieces D, substantially as herein shown and described.

4. In a rake, the combination, with the plate A and teeth B, of the socket F, formed of two U-shaped bent strips, G, and a bent strip, J, all these parts being riveted to the plate A, substantially as herein shown and described.

The foregoing specification of my improved rake signed by me this 14th day of October, 1881.

OLOF BERGSTROM.

Witnesses:
NERE A. ELFWING,
E. H. BRUHN.